PHASE SENSITIVE MICROWAVE MEMORY DEVICE

Filed Aug. 4, 1966

*INVENTOR*
RODGER L. GAMBLIN

BY Ronald J. Clark
*ATTORNEY*

1

3,444,539
PHASE SENSITIVE MICROWAVE MEMORY DEVICE

Rodger L. Gamblin, Vestal, N.Y., assignor to International Business Machines Corporation, Armonk, N.Y., a corporation of New York Filed Aug. 4, 1966, Ser. No. 570,347
Int. Cl. G11b 5/00
U.S. Cl. 340—174 5 Claims

ABSTRACT OF THE DISCLOSURE

A non-destructive read-out thin film memory operating in the region of the microwave absorption frequency to provide an output signal in which the information is contained in the phase rather than the amplitude characteristic.

This invention relates to thin film microwave absorption memories and, more particularly, to an improved thin film microwave absorption memory device which utilizes the phase shifting capabilities of a thin film element for nondestructively reading out the magnetization state of the thin film element.

The use of thin film devices as memory elements is well known. In such a device, an external write mechanism magnetizes the thin film element in one direction along its easy axis. A read drive line is positioned parallel to the easy axis and carries a current pulse such as to rotate the magnetization vector out of the easy axis and into an excited position towards the hrd axis. The intensity of he read pulse is not sufficient to completely rotationally switch the state of the thin film element. A sense line is positioned at right angles to the drive line for picking up through magnetic coupling the energy released when the excited magnetization vector returns to its stable position.

Among other problems associated with thin film memory elements, the amount of energy sensed by the sense line is so small that amplifiers cannot be found that operate trouble-free. The rotational switching during read-out gradually destroys the stable magnetization state of the thin film, necessitating a rewriting of the desired information back into the element. This rewriting may be necessary as often as every $10^4$ read-outs.

Accordingly, it is an object of the instant invention to provide a thin film microwave absorption device which is truly nondestructive in that repeated read-outs of a device do not affect the magnetization state of that device.

It is a further object of the instant invention to provide a thin film microwave absorption structure which is truly a nondestructive read-out structure by interrogating a storage position by a sensing frequency passing on a line parallel to the easy axis of the structure, which frequency generates a magnetic field for rotating the stable magnetic vector of the structure into the hard axis direction without disturbing the information content of the structure.

It is another object of the instant invention to provide a thin film microwave absorption device which delivers an adjustable and variable output signal by time integrating the read-out signal.

It is a still further object of the instant invention to provide a thin film microwave absorption device which delivers a higher output signal in response to a read pulse than is available in prior art devices.

It is a still further object of the instant invention to provide a thin film microwave absorption device which is phase sensitive to an interrogating input signal.

2

It is another object of the instant invention to provide a thin film microwave absorption memory which operates to read out a word by gate selection rather than selecting a single element or a group of related elements.

According to these objects, the instant invention contemplates the use of a microwave signal generator as a source of the sensing signal. A frequency doubler circuit increases the frequency of the microwave generator and simplifies the detection of a phase shift by a phase detector after the microwave signal passes through an associated thin film element. A plurality of these thin film elements can be connected together in a matrix configuration to form a memory device. Associated elements are called words. Word selection is accomplished by gate selection whereby the microwave signal is gated into the desired word configuration.

The foregoing and other objects, features and advantages of the invention will be apparent from the following more particular description of a preferred embodiment of the invention, as illustrated in the accompanying drawings; wherein—

The same identifying numerals are used throughout the several views to identify the same elements.

Figure 1:
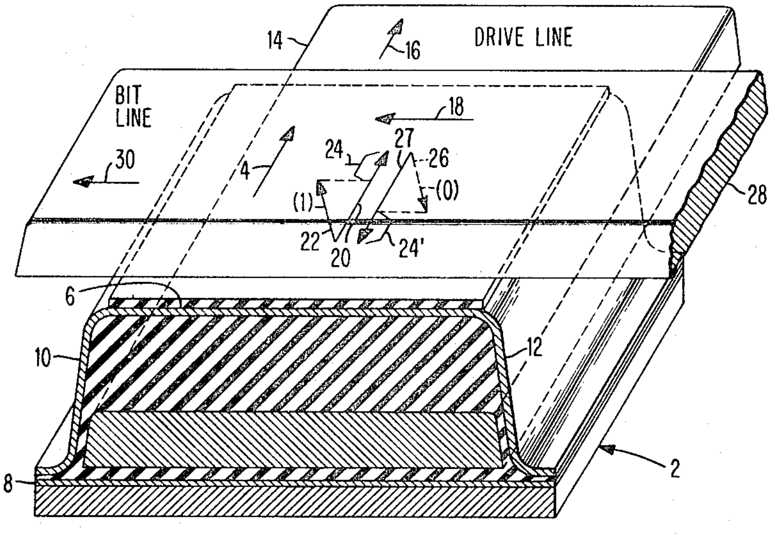
FIG. 1 is a schematic view showing the orientation of the magnetization vector present in the thin film element in relation to the axis of the element.

Referring to FIG. 1, there can be seen a thin film memory element 2 which is a portion of a larger film member not shown. This member is substantially longer than wide and is substantially trapezoidal in cross-section. The film member is constructed according to well-known electroplating and depositing techniques. The easy axis of the thin film device shown in FIG. 1 is parallel to the direction indicated by an arrow 4. The thin film device comprises an upper surface 6, a lower surface 8 and connecting members 10 and 12 which close the hard axis direction of the thin film device. A drive line 14 threads the closed surface of the thin film device and is shown parallel to the easy axis of the device. A Very High Frequency (VHF) signal generated in the manner described hereinafter, propagates down the drive line 14 in a direction indicated by an arrow 16. In this manner, a magnetic field is generated in response to the VHF signal in the direction indicated by an arrow 18. This magnetization field indicated by the arrow 18 drives the magnetization vector of the element 2, indicated by an arrow 20, into one driven state of the thin film device equal to a binary one position as represented by an arrow 22. This gives a net reduction in the strength of the magnetic state of the element 2 as indicated by the portion 24 of the arrow 20. If the magnetization vector was originally in response to a write magnetizing field of the opposite direction, the magnetization vector will be rotated in the opposite direction to a position indicated by a dashed line 26, since the binary zero condition is represented by a vector 27. A net magnetization change of 24' is obtained. The net magnetization change indicated by the portion 24 or 24' is coupled to a bit sense line 28 and a resultant electromotive force (EMF) is generated in the bit since line 28 in the direction indicated by an arrow 30. A 90° phase difference is detectable in the EMF on the bit line 30 in response to a microwave signal passing down the drive line 16 and the resulting coherent rotation of the magnetic field in the element 2 into either of its driven states by a pulse on the drive line 14. More specifically, when the thin film element 2 is magnetized in the binary one direction such that the magnetization vector is rotated into the new position indicated by the arrow 22, the coupling of the magnetic field to the bit sense line 28 generates an EMF which is advanced 90° out-of-phase from the signal on the drive line 14. The frequency of the signal on the bit sense line 28 is the same as the frequency on the drive line 14. When the thin film device 2 is magnetized in the binary zero position such that its magnetization vector is rotated to a new position 26, the coupling of the magnetic field to bit sense line 28 generates an EMF which is retarded 90° out-of-phase from the signal on the drive line 14. The sense line signal of the line 14 is adjustable to maximize the D-C signal change sensed by the bit sense line 28 in response to the two states of the film element 12.

The VHF signal rotates the magnetization vector of the structure at a corresponding frequency and permits the vector to return to its stable condition when the VHF signal is removed. The power output of a VHF signal can be as high as five watts and left on indefinitely without disturbing the information content of the structure.

Figure 2:
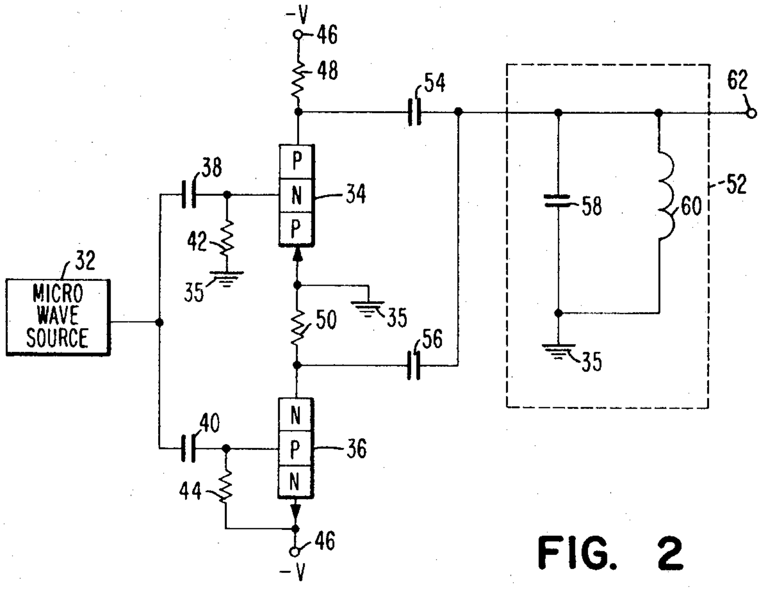
FIG. 2 is a schematic view of a frequency doubler circuit suitable for use in the present invention.

Referring to FIG. 2, there can be seen a frequency doubler circuit employed in the instant invention. A microwave source 32 which can be a transistor or any other well-known very high frequency (VHF) source, generates a frequency which should lie preferably in the range between two hundred to nine hundred megacycles. A frequency of three hundred megacycles has been selected as the preferable frequency for operation in the instant device. The output of the VHF source 32 is coupled to a base lead of a pair of transistors 34 and 36 by capacitors 38 and 40, respectively. The junction of the capacitor 38 and the base of the transistor 34 are connected to a ground connection 35 by a resistor 42. The junction of the capacitor 40 and the base lead of the transistor 36 are connected to an emitter lead of the transistor 36 by a resistor 44. The junction of the resistor 44 and the emitter lead of the transistor 36 are connected to a source of negative potential 46. A suitable source of potential is −6 volts. A collector lead of the transistor 34 is connected to the negative source of potential 46 by a resistor 48. An emitter lead of the transistor 34 is connected to a collector lead of the transistor 36 by a resistor 50. The junction of the resistor 50 and the emitter lead of the transistor 34 are connected to ground 35. The output signals from the collector lead of both transistors 34 and 36 are connected to a tank circuit 52 by capacitors 54 and 56, respectively. The tank circuit comprises a capacitor 58 and a coil 60 connected in parallel between the junction of the capacitors 54 and 56, and ground 35. The output of the tank circuit is connected to an output terminal 62.

The output signal from the microwave source 32 alternately turns on transistors 34 and 36, which in turn delivers negative spikes of voltage to the output tank circuit 52 at twice the frequency delivered by the source 32. The output terminal 62 is connected to the drive line 14 shown in FIG. 1.

Figure 3:
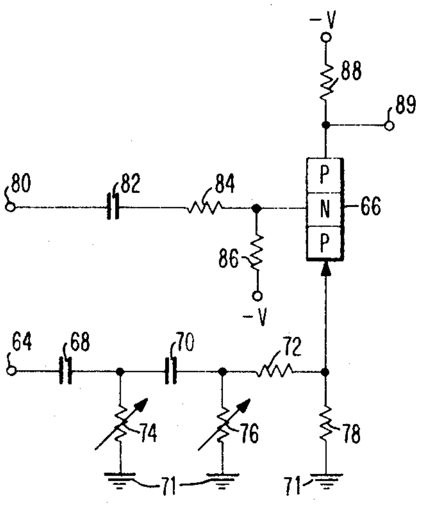
FIG. 3 is a schematic view of a phase-sensitive detector suitable for use in the present invention.

The output terminal 62 of the frequency doubler 61 shown in FIG. 2 is also connected to an input terminal 64, shown in FIG. 3. The input terminal 64 is connected to an emitter lead of a transistor 66 by a pair of capacitors 68 and 70 and a resistor 72, all being connected in series. The common junction of the capacitor 68 and a capacitor 70 are connected to a ground connection 71 by a variable resistor 74. The common junction of the capacitor 70 and the resistor 72 are connected to ground 71 by a variable resistor 76. The common junction of the resistor 72 and the emitter lead of the transistor 66 are connected to ground 71 by a resistor 78. A second input terminal 80 receives a second input frequency from the bit sense line 28 after the signal has been coupled thereto by the change in magnetic field caused by a pulse on the drive line 14. The second input terminal 80 is connected to a base lead of the transistor 66 by a capacitor 82 and a resistor 84 connected in series. The junction of the resistor 84 and the base lead of the transistor 66 are connected to a source of negative bias potential of −1.5 volts by a resistor 86. A collector lead of the transistor 66 is connected to a negative source of potential by a resistor 88. A suitable negative source of potential is at the level of −6 volts. The output signal from the phase-sensitive detector which indicates whether the original magnetization stage of the thin film device was in a binary one or a binary zero condition, is taken from the junction of the resistor 88 and the collector lead of the transistor 66 and applied to an output terminal 89. The variable resistors 74 and 76 are employed to maximize the output signal available at the output terminal 89. More specifically, the variable resistors are adjustable to render a minimum output for one phase relationship, i.e. 90° advance of the input signal, thereby automatically giving a maximum output signal for the other phase relationship, i.e. 90° retard, of the input signal.

Figure 4:
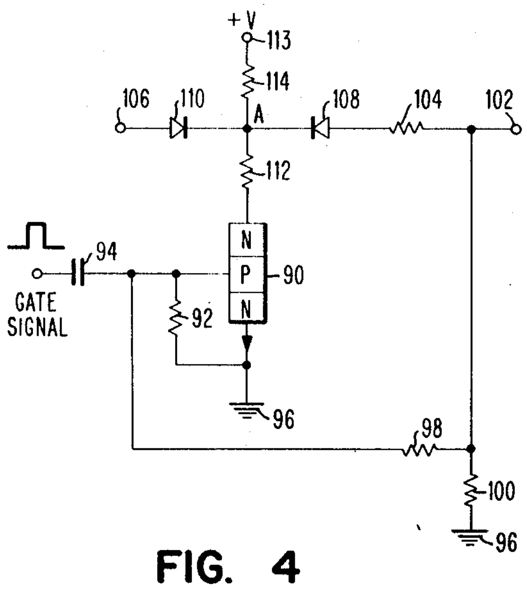
FIG. 4 shows a schematic view of a suitable gate used for selecting a word in a thin film memory.

FIG. 4 is a schematic view of a suitable VHF gate which can be used in the instant invention for switching and directing the VHF signal across the desired read-out drive lines. A transistor 90 has its base lead connected to the junction of a resistor 92 and a capacitor 94. The other end of the resistor 92 is connected to an emitter lead of the transistor 90 and to a ground connection 96. The other end of the capacitor 94 is connected to means, not shown, used to select which of the VHF gates is to be activated for reading out a word stored in the microwave memory. This selection means should be a standard design, such as a standard diode matrix or other transistor gating matrices used to select a word in a core memory. The junction of the capacitor 94 and the resistor 92 are connected to ground 96 by a pair of resistors 98 and 100. The junction of the resistors 98 and 100 is connected to the junction of an output terminal 102 and a resistor 104. The other end of the resistor 104 is connected to an input terminal 106 by a pair of diodes 108 and 110. The junction of the diodes 108 and 110 is made at their cathode terminal. This junction is also connected to a collector lead of the transistor 90 by a resistor 112 and to a source of positive potential 113 by a resistor 114. A suitable positive potential is +6 volts.

In operation, normally both diodes 108 and 110 are back biased, so that no VHF signal is transmitted to the output terminal 102. A gate signal applied to the capacitor 94 lowers the voltage at the junction of the diodes 108 and 110 and the resistors 112 and 114 so that the diodes 108 and 110 become forward biased and the VHF signal is transmitted from the input terminal 106 to the output terminal 102. The gate signal is also summed with the output of the VHF line by means of the resistor path comprising the resistor 98, to prevent a pedestal from being superimposed with the VHF signal.

Figure 5:
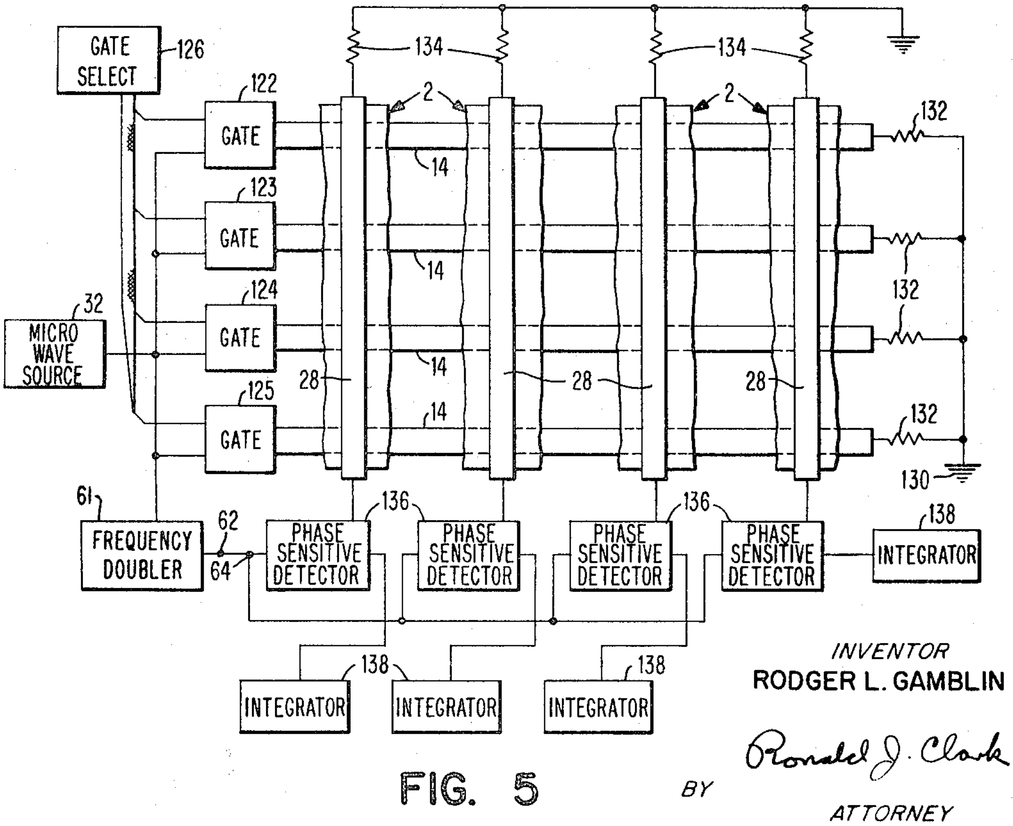
FIG. 5 shows a representative memory constructed according to the principles of the instant invention.

Referring to FIG. 5, there can be seen a block diagram of a two-dimensional memory system built according to the principles of the instant invention. A microwave source 32 provides a microwave signal to a plurality of VHF gates 122–125. A standard matrix-type gate select circuit 126 selects which of the gates will be activated for the transmission of the VHF signal from the oscillator 120 down the associated drive line 14 connected to each of the VHF gates 122–125, respectively. Each of the drive lines 14 is connected to ground connection 130 by a terminating resistor 132. A terminating resistor 134 is also connected to one end of each of the sense lines 28 and a phase-sensitive detector 136 is connected to the other end of the sense line 28. The sense lines 28 are positioned transverse to the plurality of drive lines 14. More specifically, each of the sense lines intersect each of the drive lines 14. The intersection of the sense and drive lines represents a storage location. A write means is not shown in FIG. 5. The write means operable with the present invention is the standard write means well known in the art which employ a D-C pulse along the VHF lines 14 and a bipolar pulse along the sense lines 28, respectively. The intersection of the active lines provides a means of switching to either of the two stable states of the thin film surface 134.

A plurality of integration circuits 138 are shown connected to the detectors 136 respectively. These integration circuits are of standard design and operate to improve the output signals from the structures 2 on the sense line 28 by generating a single pulse in response to several cycles of the phase shifted signal. Standard design techniques can be employed to design an integrating circuit which has an output pulse suitable for the device which is to operate herewith.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A phase-sensitive microwave memory device comprising:

a thin film structure having an upper surface, a lower surface and connecting members positioned therebetween for forming a closed surface, said thin film structure being formed with an easy axis and a hard axis and having a first magnetic state characterized by a first magnetization vector lying parallel to said easy axis and having a second stable state characterized by a second magnetization vector lying parallel but opposite to said first vector, a source of very high frequency signals for generating a basic frequency, a frequency doubler responsive to said source for increasing said basic frequency to a reference frequency, a drive line responsive to said source, threaded through said closed surface and positioned parallel to said easy axis, a sense line placed atop said upper surface and positioned orthogonal to said drive line, a phase-sensitive detector having a reference input terminal, a sensing input terminal, and an output terminal, said reference input terminal being responsive to said frequency doubler circuit, said sensing input terminal being responsive to said sense line; and an integrating circuit connected to said output terminal.

2. A phase-sensitive microwave memory device comprising:

a coupled hard axis thin film structure exhibiting a microwave absorption characteristic band of resonant and semi-resonant frequencies, said thin film structure being formed with an easy axis and a hard axis and having a first stable magnetic state characterized by a first magnetization vector lying parallel to said easy axis and having a second stable state characterized by a second magnetization vector lying parallel but opposite to said first vector, a source of very high frequency signals for generating a reference frequency lying within said absorption band, a drive line responsive to said source, located within said structure and positioned parallel to said easy axis of said structure, said reference frequency interacting with either of said magnetization vectors characterizing said stable states of said structure for generating a varying electro-motive force of offset phase with said reference frequency, a sense line placed adjacent to said structure and positioned orthogonal to said drive line for picking up said electromotive force, a detector means connected to said sense line and responsive to said electro-motive force for maximizing an output signal therefrom; and integrating means responsive to said maximized output from said detector for improving characteristics of said maximized electro-motive force.

3. A phase-sensitive microwave memory device comprising:

a coupled hard axis thin film structure having a resonant microwave absorption frequency of approximately six hundred megacycles, said thin film structure being formed with an easy axis and a hard axis and having a first stable magnetic state characterized by a first magnetization vector lying parallel to said easy axis and having a second stable state characterized by a second magnetization vector lying parallel but opposite to said first vector, very high frequency means for generating a reference signal substantially equal to said resonant frequency, a drive line responsive to said means, located within said structure and positioned parallel to said easy axis of said structure for generating a varying magnetic field, said magnetic field encircling said drive line and substantially contained within said structure, said reference frequency interacting with said first magnetization vector and said second magnetization vector for generating a first varying electro-motive force and a second varying electro-motive force having an advanced phase offset and a retarded phase offset respectively with said reference frequency, a sense line placed adjacent to said structure and positioned orthogonal to said drive line for picking up said electro-motive force, a detector means connected to said sense line and responsive to said electro-motive force for maximizing an output signal therefrom, and integrating means responsive to said maximized output from said detector for improving characteristics of said maximized signal.

4. An improved phase-sensitive microwave memory matrix comprising:

a plurality of coupled hard axis thin film structures having a resonant microwave absorption frequency, each of said thin film structures being formed with an easy axis and a hard axis and having a first stable magnetic state characterized by a first magnetization vector lying parallel to said easy axis and having a second stable state characterized by a second magnetization vector lying parallel but opposite to said first vector, very high frequency means for generating a reference signal substantially equal to said resonant frequency, a drive line network having a plurality of branch drive lines, a gate interposed in each of said branch drive lines, respective axes of said branch drive lines threading corresponding hard axis structures and being positioned parallel to said easy axis of said corresponding structures for generating a varying magnetic field along said structure, said magnetic fields encircling said respective drive lines and substantially contained within corresponding structures, said reference frequency interacting with said first magnetization vector and said second magnetization vector for generating a first varying electro-motive force and a second varying electro-motive force having an advanced phase offset and a retarded phase offset respectively with said reference frequency, a plurality of sense lines placed adjacent to said structures and positioned orthogonal to said drive lines for picking up said electro-motive force generated within a corresponding portion of said structure located adjacent the intersection of corresponding drive branch lines and sense lines, a detector means connected to each of said sense lines and responsive to said electro-motive force for maximizing an output signal therefrom, a plurality of integrating means responsive to said maximized output from corresponding detectors for improving the characteristics of said maximized signal.

5. An improved phase-sensitive microwave memory matrix as recited in claim 4 and further including:

means for operating a selected one of said gates.

References Cited

UNITED STATES PATENTS 3,375,503 3/1968 Bertelsen ---------- 340—174

JAMES W. MOFFITT, *Primary Examiner.*